(12) United States Patent
Broderick et al.

(10) Patent No.: US 6,198,759 B1
(45) Date of Patent: Mar. 6, 2001

(54) LASER SYSTEM AND METHOD FOR BEAM ENHANCEMENT

(75) Inventors: Jeffery A. Broderick; Benjamin K. Jones; Jason W. Bethel, all of Seattle; Eugene F. Yelden, Mill Creek, all of WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

(21) Appl. No.: 09/472,733

(22) Filed: Dec. 27, 1999

(51) Int. Cl.$^7$ ....................................................... H01S 3/14
(52) U.S. Cl. ................................ 372/39; 372/87; 372/92; 372/64
(58) Field of Search ................... 372/87, 55, 51, 372/53, 56, 92, 39, 64

(56) References Cited

U.S. PATENT DOCUMENTS

| | | | |
|---|---|---|---|
| 4,129,836 | 12/1978 | Papayoanou | 331/94.5 D |
| 4,433,418 | * 2/1984 | Smith | 372/95 |
| 4,446,558 | 5/1984 | Sepp et al. | 372/64 |
| 4,481,634 | 11/1984 | Grossman et al. | 372/87 |
| 4,500,996 | 2/1985 | Sasnett et al. | 372/19 |
| 4,577,323 | 3/1986 | Newman et al. | 372/64 |
| 4,618,961 | 10/1986 | Sutter, Jr. | 372/87 |
| 4,719,639 | 1/1988 | Tulip | 372/66 |
| 4,759,027 | 7/1988 | Hahn et al. | 372/61 |
| 4,805,182 | 2/1989 | Laakmann | 372/82 |
| 4,837,772 | 6/1989 | Laakmann | 372/82 |
| 4,841,539 | 6/1989 | Hahn et al. | 372/63 |
| 4,939,738 | 7/1990 | Opower | 372/95 |
| 5,008,894 | 4/1991 | Laakmann | 372/38 |
| 5,048,048 | 9/1991 | Nishimae et al. | 372/95 |
| 5,065,405 | 11/1991 | Laakmann et al. | 372/92 |
| 5,123,028 | 6/1992 | Hobart et al. | 372/95 |
| 5,125,001 | * 6/1992 | Yagi et al. | 372/92 |

(List continued on next page.)

OTHER PUBLICATIONS

Hall, D.R. and Hill, C.A., *Handbook of Molecular Lasers*, Marcel Dekker, Inc., New York, NY, 1987, Chap. 3, "Radiofrequency–Discharge–Excited $CO_2$ Lasers," pp. 165–258.

Hodgson, N. and Weber, H., *Optical Resonators: Fundamentals, Advanced Concepts and Applications*, Springer–Verlag, London, 1997, Chap. 2, pp. 54–114.

Hodgson, N. and Weber, H., *Optical Resonators: Fundamentals, Advanced Concepts and Applications*, Springer–Verlag, London, 1997, Chap. 5, pp. 165–222.

Oron, R. et al., "Laser Mode Discrimination with Intracavity Spiral Phase Elements," *Opt. Comm.*, 169:115–121, 1999.

Witteman, W.J., *The $CO_2$ Laser*, Springer Series in Optical Sciences; v. 53, Springer–Verlag Berlin Heidelberg, 1987, pp. 170–178.

*Primary Examiner*—Leon Scott, Jr.
(74) *Attorney, Agent, or Firm*—Seed IP Law Group PLLC

(57) ABSTRACT

A laser system and method for beam enhancement utilizes shaped electrodes or one or more shaped lasing media, including crystal media, to prescribe the operational transverse modes of the laser. The electrodes and shaped lasing media are shaped with respect to the transverse mode or modes to be selected for operational use. In some embodiments shaping is done according to the selected transverse modes for operation so that at least a designated percentage of the total operational power of the beam is made up of the selected transverse modes. The designated percentage of total operational power of the selected transverse modes can be 90% of the total power of the beam, but in other more relaxed cases can be 85% and in other more stringent cases are 95% of the beam. In some embodiments, the electrodes or lasing media are so shaped that the theoretical fundamental transverse mode is the only selected transverse operational mode. Some embodiments utilize folded resonators. Other embodiments utilize other resonators including resonators having multiple discharge sections and are not folded.

28 Claims, 9 Drawing Sheets

U.S. PATENT DOCUMENTS

| | | | |
|---|---|---|---|
| 5,131,003 | 7/1992 | Mefferd | 372/65 |
| 5,140,606 | 8/1992 | Yarborough et al. | 372/64 |
| 5,164,952 | 11/1992 | Guenther | 372/61 |
| 5,197,079 | 3/1993 | Krueger et al. | 372/87 |
| 5,220,577 | 6/1993 | Opower | 372/92 |
| 5,231,644 | 7/1993 | Krueger et al. | 372/107 |
| 5,245,625 | 9/1993 | Guenther | 372/82 |
| 5,255,283 * | 10/1993 | Belanger et al. | 372/92 |
| 5,271,029 * | 12/1993 | Seiffarth et al. | 372/64 |
| 5,335,242 | 8/1994 | Hobart et al. | 372/95 |
| 5,353,297 | 10/1994 | Koop et al. | 372/64 |
| 5,392,309 * | 2/1995 | Nishimae et al. | 372/95 |
| 5,412,681 * | 5/1995 | Eisel et al. | 372/64 |
| 5,430,753 | 7/1995 | Welsch et al. | 372/87 |
| 5,600,668 | 2/1997 | Erichsen et al. | 372/87 |
| 5,661,746 | 8/1997 | Sukhman et al. | 372/83 |
| 5,684,822 * | 11/1997 | Partlo | 372/95 |
| 5,748,663 | 5/1998 | Chenausky | 372/64 |
| 5,754,575 | 5/1998 | Sukhman et al. | 372/36 |
| 5,822,354 | 10/1998 | Vitruk | 372/92 |
| 5,881,087 | 3/1999 | Sukhman | 372/61 |
| 5,892,782 * | 4/1999 | Vitruk et al. | 372/64 |
| 5,894,493 | 4/1999 | Sukhman et al. | 372/83 |
| 5,953,360 | 9/1999 | Vitruk et al. | 372/87 |
| 5,982,803 | 11/1999 | Sukhman et al. | 372/87 |

\* cited by examiner

LASER SYSTEM AND METHOD FOR BEAM ENHANCEMENT

CROSS-REFERENCE TO RELATED APPLICATIONS

The present invention is related to commonly assigned, concurrently filed and co-pending U.S. patent application Ser. Nos. 09/472,731 for "LASER WITH SIMPLIFIED RESONATOR FOR PRODUCING HIGH QUALITY LASER BEAMS"; 09/472,726 for "LASER WITH HEAT TRANSFER SYSTEM AND METHOD"; and 09/472,735 for "LASER ASSEMBLY SYSTEM AND METHOD." All of the above U.S. Applications are incorporated by reference.

TECHNICAL FIELD

The present invention relates generally to beam enhancement for lasers, and more particularly, to a laser system and method for laser beam mode discrimination.

BACKGROUND OF THE INVENTION

A laser is based upon oscillation of light in a resonator cavity having ends bounded by mirrors. Generally, the wavelength of the light used for a particular laser is a fraction of the length of the resonant cavity so the light can oscillate with many modes concurrently. The modes for oscillation of light in laser resonant cavities are either classified as transverse or longitudinal modes.

Longitudinal modes are associated with the profile of the laser beam in the longitudinal direction and correspond to various resonant frequencies based on how multiple wavelengths of light match the length of the laser cavity. In general for a wide variety of applications, the transverse modes are of more interest than the longitudinal modes. For instance, many applications would benefit from limiting the number of transverse modes, but would not be equally benefited by limiting the number of longitudinal modes since the number of transverse modes affects the intensity pattern of the laser beam and more often influences beam quality.

Transverse modes are associated with cross-sectional profiles of the laser beam that are transverse to the direction of beam propagation. A laser beam typically has more than one transverse mode. If one could take a series of cross-sectional slices out of a transverse mode, each slice being transverse to the direction of beam propagation and the series of slices taken along the length of the transverse mode following the direction of beam propagation, these slices would reveal certain interesting characteristics of transverse modes. Generally, a slice from one transverse mode, for a particular longitudinal position along a laser beam, will differ in its pattern from a slice from another transverse mode at the same longitudinal position. The patterns may be complex, having many separate parts, or may be a single continuous pattern of simple design such as a dot, square, rectangle, etc.

Although a laser will have many theoretical transverse modes of higher order such as $TEM_{01}$, $TEM_{10}$, $TEM_{11}$, $TEM_{20}$, $TEM_{02}$, $TEM_{12}$, $TEM_{21}$, $TEM_{22}$, etc., a laser will only have one single theoretical lowest order mode, $TEM_{00}$, also known as the theoretical fundamental mode. In practice, often the lowest order mode at which a laser is able to operate is not its theoretical fundamental mode.

Ideally, for many applications it is desirable to prescribe the number of operational transverse modes of a laser. Often, it is ideal to prescribe the operational transverse modes of a laser to be solely the theoretical fundamental transverse mode. Other times it is desirable to prescribe the operational transverse modes of a laser to a higher order transverse mode and to exclude the theoretical fundamental transverse mode of the laser from being present as an operational transverse mode in the operational beam of the laser.

For instance, some lasers for cutting certain materials used in packaging tend to work best with a laser beam having a operational transverse mode of order one degree higher than its theoretical fundamental transverse mode. For this packaging related beam, all other transverse modes, including its theoretical fundamental transverse mode, are excluded from being present in the beam. On the other hand, some lasers used to cut metal work best with their theoretical fundamental transverse mode being the only operational transverse mode present in the laser beam.

Still other applications may call for limiting the laser beam to a combination of selected transverse modes that may or may not include the theoretical fundamental transverse mode as one of the operational transverse modes. Many lasers are constructed so that it is rather difficult or impossible to have them operate at their theoretical fundamental transverse mode or other transverse modes while operating with other undesirable transverse modes present. Challenges then, on one hand, exist to exclude many transverse modes from an operational laser beam. On the other hand, other challenges exist to force other transverse modes to be present in the operational laser beam even though a particular construction of a laser may not be readily conducive to have the desired transverse modes as part of the operational laser beam.

Fortunately, for many applications, transverse modes of higher order are generally undesirable, whereas only one or a few transverse modes of lower order are generally desirable. Many times the theoretical fundamental mode of a laser is the only transverse mode that is desirable as an operational transverse mode. Other times, there may be one or a few transverse modes of orders very close to or adjacent to the theoretical fundamental transverse mode that are desirable as operational transverse modes either alone or in combination with the theoretical fundamental transverse mode of the laser.

Conventional methods exist to limit operational transverse modes to certain lower order modes, such as the theoretical fundamental transverse mode of a laser or a small number of lower order transverse modes, while excluding modes of higher order from being present in the laser beam. These conventional methods have had varying degrees of success and include intra-cavity optical telescopes with solid state lasers, extra-cavity optical telescopes with spatial filters, and filters or interferometers built into the electrode structure. Unfortunately, these conventional solutions tend to be complex and can significantly increase manufacturing costs.

SUMMARY OF THE INVENTION

A laser system and method for beam enhancement has aspects including a lasing medium, a discharge space, front and rear mirrors, and first and second elongated electrodes. The front and rear mirrors are on opposing ends of the discharge space and at least a portion of the lasing medium is within the discharge space. The first elongated electrode has a first inner surface and the second elongated electrode has a second inner surface. The first and second inner surfaces extend along a longitudinal axis. The first inner surface has a front end portion toward the front mirror and a rear end portion toward the rear mirror. The second inner surface has a front end portion toward the front mirror and a rear end portion toward the rear mirror. The first and second inner surfaces have inter-portions between their respective front and rear portions. The first and second inner surfaces are on opposing sides of the discharge space and are separated by an inter-electrode gap. Portions of the first inner surface and the second inner surface along the longitudinal axis are shaped according to their positions along the longitudinal axis to have continuous variations in one or more portions of the inter-electrode gap with the inter-electrode gap between the inter-portions of the first and second inner surfaces being at least 5% different than the inter-electrode gap between the front end portions of the first and second inner surfaces due to the continuous variations, and the inter-electrode gap between the inter-portions of the first and second inner surfaces being at least 5% different than the inter-electrode gap between the rear end portions of the first and second inner surfaces due to the continuous variations. The distance along the longitudinal axis between the inter-portions and the front end portions of the first and second inner surfaces being at least 25% of the distance between the front and rear mirrors. The distance along the longitudinal axis between the inter-portions and the front end portions of the first and second inner surfaces being at least 25% of the distance between the front and rear mirrors.

Further aspects include the lasing medium comprising one or more of the following: carbon dioxide, nitrogen, helium, xenon, neon, carbon monoxide, hydrogen, water, krypton, argon, fluorine, deuterium, and oxygen. Additional aspects include the first and second surfaces being shaped such that the inter-electrode gap along the longitudinal axis varies to approximate the theoretical fundamental transverse mode of the laser.

DETAILED DESCRIPTION OF THE INVENTION

Figure 1:
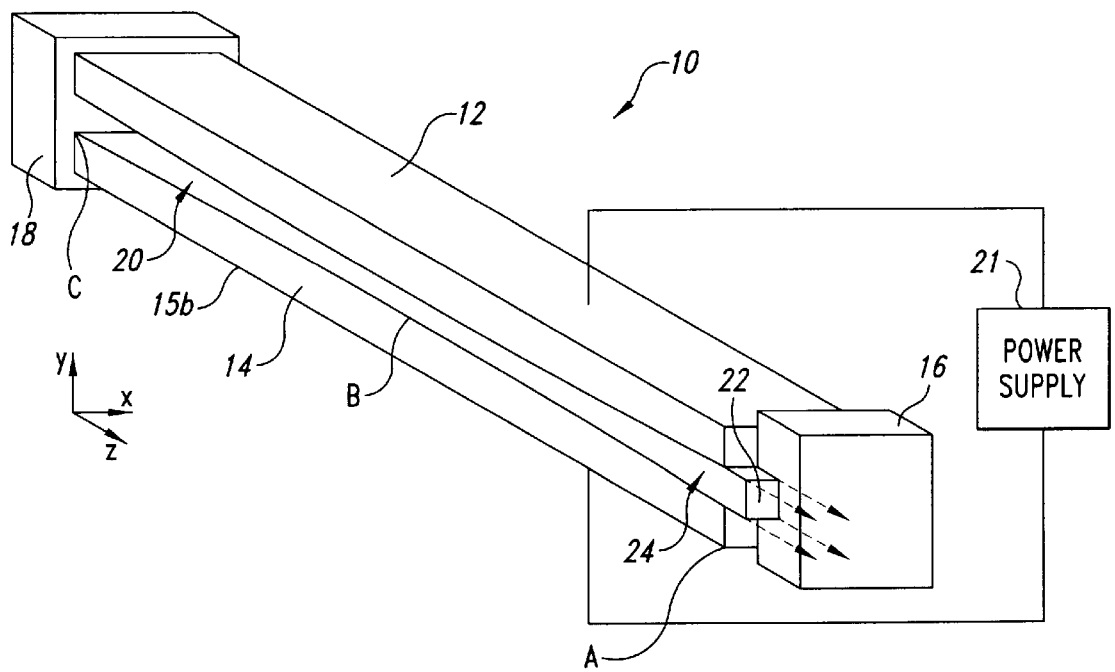
FIG. 1 is an isometric schematic drawing of a slab laser utilizing an embodiment of the present invention.

As shown in the drawings for purposes of illustration, the present invention is embodied in a narrow gap, or slab, gas laser with a laser beam enhancement system. The slab laser is generally indicated by reference 10 in FIG. 1. The depicted embodiment of the slab laser 10 includes spaced apart, first and second elongated slab electrodes 12 and 14 opposing each other and extending between a front resonator mirror 16 and a rear resonator mirror 18. For the depicted embodiment, the electrodes 12 and 14 are 50 mm in total width along the transverse x-axis and 50 cm in total length along the longitudinal z-axis. The first and second inner surfaces 15a (not shown in FIG. 1) and 15b of the first and second electrodes 12 and 14, respectively, are flat with respect to the x-axis, but both the first and second inner surfaces have a bowed or slight convex longitudinal profile with respect to the z-axis so that the first and second inner surfaces are separated by an inter-electrode gap that varies along the z-axis. For other embodiments, in addition to the first inner surface 15a of the first electrode 12 and the second inner surface 15b of the second electrode 14 having a curved profile longitudinally along the z-axis, the first and second inner surfaces also have a curved profile transversely along the x-axis. Other embodiments include the inner surfaces 15a and 15b of the first and second electrodes 12 and 14, respectively, as planes that are not parallel with the z-axis, or as planes that are not parallel with either of the z-axis or the x-axis so that the inter-electrode gap between the planar inner surfaces varies with respect to positions along the z-axis or positions along the z-axis and the x-axis.

This inter-electrode gap of the slab-laser 10 of the embodiment depicted in FIG. 1 varies and for front longitudinal position A, mid-longitudinal position B, and rear longitudinal position C is 4.5 mm, 4.1 mm, and 4.5 mm, respectively. The depicted embodiment, as described further below, using these first and second electrodes 12 and 14 with their varying inter-electrode gap, as described above, operates at a single transverse mode and has demonstrated a 8 to 12% improvement in operational efficiency as compared with a similar slab laser that operates at many transverse modes using a constant inter-electrode gap of 4.5 mm.

The gas lasing medium is positioned within an optical resonator cavity 20 formed between the front and rear mirrors 16 and 18. The front and rear mirrors 16 and 18 are concave-concave optical elements with respect to the x-axis that form a negative branch unstable resonator and are plano-concave optical elements with respect to the y-axis that form a stable resonator. The radii of curvature with respect to the x-axis are 499 mm and 554 mm, and with respect to the y-axis are infinite and 3000 mm for the front and rear mirrors 16 and 18, respectively. With respect to both the x-axis and the y-axis, the optical path length is 526 mm.

The resonator cavity 20 serves as a discharge area having a discharge space, more generally known as a gain region, for the gas lasing medium. In the depicted embodiment, the resonator cavity has a rectangular box shape with a rectangular cross-section with respect to the x-axis and the y-axis, however, alternative embodiments have square cross-sections, annular cross-sections, round sections, elongated cross-sections or other shaped resonator cavities in one or more dimensions, such as folded resonator cavities that are folded in one or more dimensions.

Figure 2:
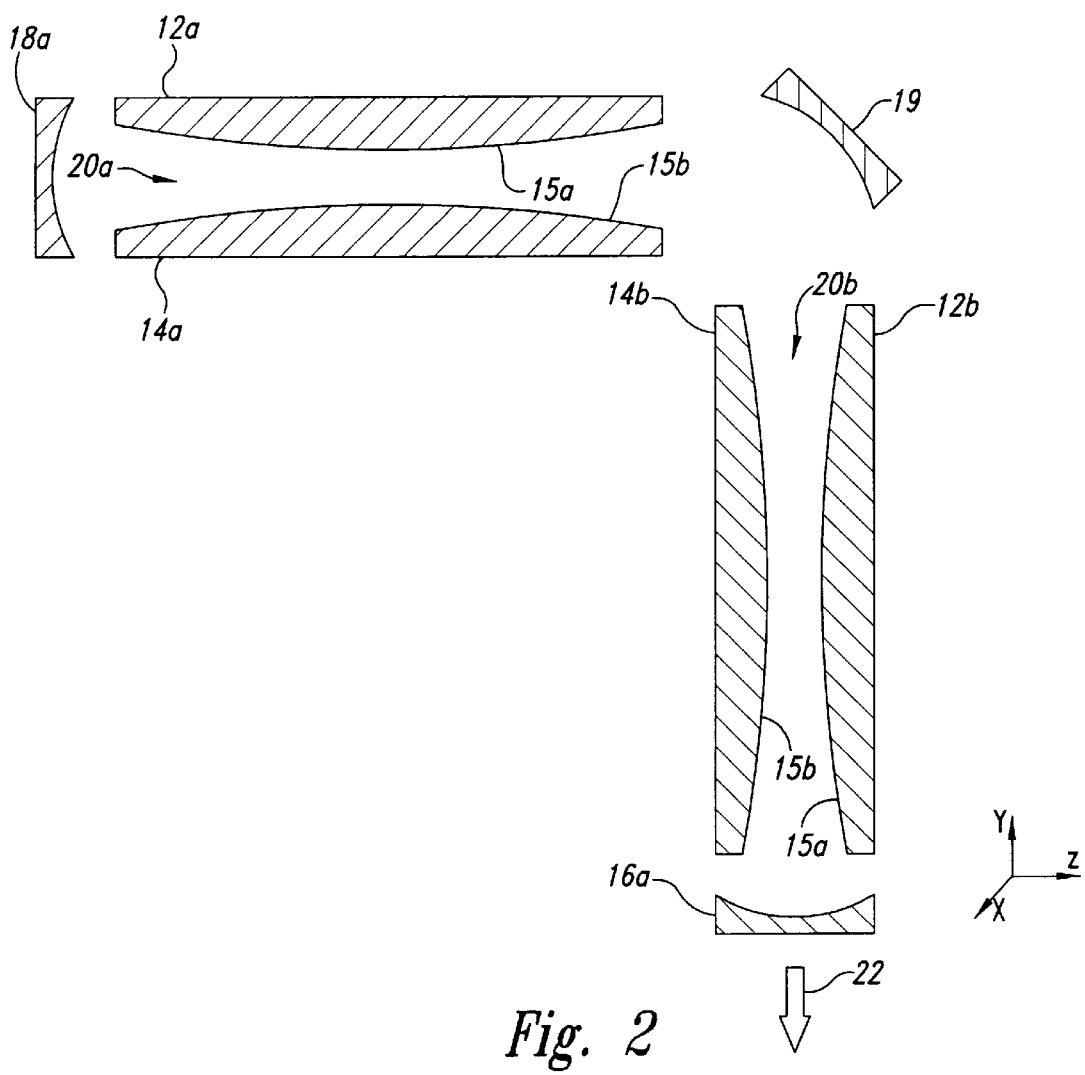
FIG. 2 is a longitudinal cross-sectional schematic drawing of a slab laser utilizing a folded resonator embodiment of the present invention.

The slab laser 10 can have a folded resonator such as shown in FIG. 2, which in this case has a flat mirror 19 positioned between the front and rear mirrors 16a and 18a. Typical with folded cavities, there are multiple resonator sections, such as a first resonator section 20a having first and second electrodes 12a and 14a and a second resonator section 20b having first and second electrodes 12b and 14b, also shown in FIG. 2. Other embodiments have other configurations of mirrors and resonator cavities, including more than two resonator cavities.

For the depicted embodiment, the gas lasing or gain medium is a standard mixture of one part carbon dioxide ($CO_2$), one part nitrogen ($N_2$), and three parts helium (He), with the addition of 5% xenon (Xe) at a pressure of 50 Torr. Other embodiments use other gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases at various other gas pressures such as 30 to 120 Torr; however, it will be appreciated that a non-gaseous lasing medium could also be employed.

For instance, an alternative embodiment lasing medium could comprise one or more of the following vapors: copper, gold, strontium, barium, cadmium, a halide compound of copper, a halide compound of gold, a halide compound of strontium, a halide compound of barium, a halide compound of cadmium, and other similar elements.

Other embodiments use for the lasing medium a solid state laser crystal, a liquid, a chemical, or other lasing medium known in the art. The solid state laser crystal embodiments include crystals that are composed of, for example, ruby, YAG, Ti-sapphire, or some other combination of host material (such as glass, oxides, sapphire, garnets, aluminates, oxysulfides, phosphates, silicates, tungstates, molybdates, vanadates, beryllates, fluorides, and ceramics) and active ion (such as neodymium, erbium, holmium, thulium, praseodymium, gadolinium, europium, ytterbium, cerium, samarium, dysprosium, terbium, promethium, lutetium, uranium, chromium, titanium, nickel, and cobalt), or other crystal lasing media. These alternative embodiments may also include appropriate housings, such as sealed housings, to contain the lasing medium or to allow desired purging of the medium. Examples of embodiments using a liquid lasing medium include those using a dye lasing medium. Embodiments using a chemical lasing medium including a chemical oxygen-iodine laser (COIL).

The slab laser 10 also includes a power supply 21 that applies excitation energy to the gas lasing medium, which causes the lasing medium to emit laser energy. The excitation energy supplied by the power supply 21 in the depicted embodiment has an associated RF power, but may also be associated with microwave, pulsed, continuous wave, direct current, alternating current, or any other power source that stimulates the lasing medium into producing laser energy. Alternative embodiments utilize other forms of excitation including optical pumping such as with flashlamps or laser diodes or other methods to excite the lasing medium consistent with common practice or use energy sources based upon solar energy, nuclear energy, or chemical energy, or any combination of the above.

The depicted embodiment cools the lasing medium by conducting heat through the electrodes 12 and 14 and further conducting heat from the electrodes through thermal material to the housing where the heat is removed from the housing by convection to the surrounding air and by conduction to a cooling fluid. Other embodiments utilize methods known in the art including utilizing liquid or gas flow through or within the laser structures or other systems using forms of convection, conduction, or radiation known in the art.

When an RF voltage is applied to the gas lasing medium via the slab electrodes 12 and 14, a gas discharge forms within the resonator cavity 20 between the front and rear mirrors 16 and 18. For the depicted embodiment, the plasma discharge is electrically excited by a radio frequency generator of the power supply 21 applied via a matching network directly to the first and second electrodes 12 and 14. The RF frequency generator of the power supply 21 operates at a frequency of 40.68 MHz with an output power level of at least 1 kW, but other embodiments operate at other frequencies and power levels.

The generator of the power supply 21 is connected to the first and second electrodes 12 and 14 in a biphase fashion such that the phase of the voltage on one electrode is shifted substantially 180 degrees relative to the voltage on the other electrode to achieve a biphase excitation. The front and rear mirrors 16 and 18 form the laser energy into a laser beam 22 that travels back and forth in a longitudinal direction along the z-axis as shown in FIG. 1.

Figure 2A:
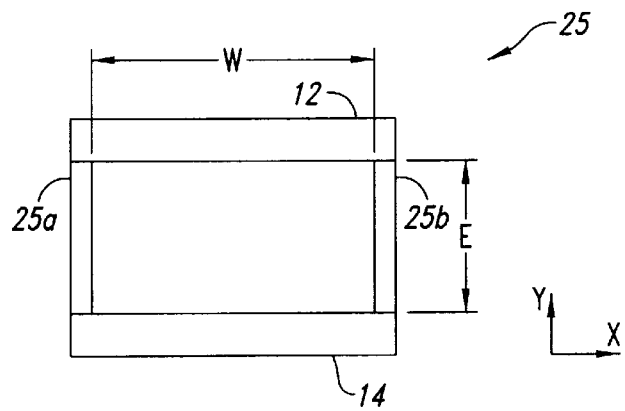
FIG. 2A is a transverse cross-sectional schematic drawing of a slab laser utilizing walls with an inter-wall gap embodiment of the present invention.

In the slab laser 10, the front and rear mirrors 16 and 18 are shaped and positioned to form an unstable resonator along the x-axis of FIG. 1 with an exit aperture 24 such that the laser beam 22 travels laterally until the laser beam exits the resonator cavity 20 via the exit aperture. The slab laser 10 has what is referred to as an unstable resonator even though its resonator is stable along the y-axis of FIG. 1 since its resonator is unstable along the x-axis. This slab laser 10 is alternatively referred to as a hybrid stable-unstable resonator since it is stable with respect to one axis, i.e., the y-axis, and unstable with respect to another axis, i.e., the x-axis. Other embodiments utilize stable-stable resonators that are stable along both the x-axis and the y-axis. Some of these embodiments with stable-stable resonators have an electrode assembly 25 with opposing first and second walls 25a and 25b extending between the first and second electrodes 12 and 14, as shown in FIG. 2A. These embodiments have an inter-electrode gap, E, between the first and second electrodes 12 and 14, and an inter-wall gap, W, between the first and second walls 25a and 25b.

The slab electrodes 12 and 14 of the slab laser 10 of FIG. 1 are positioned sufficiently far from each other so that the resonator cavity 20 acts as a free-space resonator along the y-axis with a Fresnel number of approximately 0.75 in the depicted embodiment. The slab electrodes 12 and 14 are sufficiently wide and the resonator cavity 20 has little if any sidewalls so that the laser beam 22 has free space propagation with respect to the x-axis as well. Other embodiments use resonators of other Fresnel numbers. For instance, some embodiments include resonators having Fresnel numbers with respect to the y-axis of between 0.35 and 1.5 or greater. A typical distance between front and rear mirrors would be 1 meter and typical separation distances between the electrodes, referred to as inter-electrode gaps, would be on the order of 3.5 to 8 mm for these embodiments, however, other separation distances are also used. Since the resonator cavity 20 acts as a free-space resonator, no special polishing of the slab electrodes 12 and 14 is required in the manufacturing process.

The laser beam 22 produced by the slab laser 10 exits the resonator cavity 20 via the exit aperture 24, as described above and shown in FIG. 1. Ten percent of the light within the resonator cavity 20 goes through the exit aperture 24 by passing unencumbered beyond an edge of the front mirror 16. In the depicted embodiment, the front and rear mirrors 16 and 18 have opposing concave reflective surfaces. The front and rear mirrors 16 and 18 are also confocal, i.e., have a common focal point. The exit aperture 24 is formed between the resonator walls 12 and 14 by extending the rear mirror 18 beyond an end of the front mirror 16 (along the x-axis of FIG. 1) so that the laser beam 22 is reflected by the rear mirror 18 out of the resonator cavity 20 through the exit aperture 24. The front and rear mirrors 16 and 18 are mounted to end flanges (not shown) that maintain vacuum integrity and allow proper alignment of the mirrors. The front mirror 16 and rear mirror 18 in the depicted embodiment are totally reflecting, but in other embodiments the mirrors are partially reflecting and partially transparent. Partially reflecting, partially transparent mirrors are used in some embodiments for the front mirror 16 to provide a soft edge to allow part of the laser beam 22 to exit the resonator cavity 20 of a hybrid stable-unstable resonator. Other embodiments use a partially reflecting, partially transparent mirror for the front mirror of a stable-stable resonator to allow part of the laser beam to exit the resonator cavity since the laser beam would otherwise continue to reflect back and forth between the front and rear mirrors of a stable-stable resonator with no other pathway to exit the resonator cavity.

As described above, the first and second slab electrodes 12 and 14 of the depicted embodiment have a non-planar profile along the longitudinal z-axis, which causes a varying inter-electrode gap also along the longitudinal z-axis. Since in the depicted embodiment the lasing medium is gas, this variation in inter-electrode gap along the z-axis results in the lasing medium being contoured according to this variation in inter-electrode gap. Other embodiments use methods instead of or in addition to using shaped electrodes depending upon the type of lasing medium being used. For instance, a solid state laser crystal itself could be formed or machined into the appropriate shape. In effect, the electrode or lasing medium can be contoured to truncate higher order transverse modes for single transverse mode propagation of the theoretical fundamental transverse mode of a laser, such as the slab laser 10, or propagation of a selected set of the lowest order transverse modes while all other higher order transverse modes are drastically reduced or practically eliminated from propagation.

Many applications only require that the combined power of the undesired transverse modes that are to be truncated to less than 10% of the overall power of the laser beam 22, which allows for a certain degree of tolerance in shaping the electrodes or directly shaping the lasing medium. In some applications this truncation power requirement is somewhat relaxed so that the combined power of the undesired transverse modes that are to be truncated is less than 15% of the overall power of the laser beam 22. Other applications have more stringent requirements that the combined power of the truncated transverse modes be less than 5% of the overall power of the laser beam 22, which have in turn more stringent tolerances for shaping the electrodes or directly shaping the lasing medium.

Efforts in truncating undesired transverse modes causes the inter-electrode gap or thickness in the y-axis of a lasing medium to vary according to longitudinal position along the z-axis. For some embodiments, variations according to longitudinal position, in the inter-electrode gap, inter-wall gap or in the thickness or width in lasing medium, can have differences of at least 10% between a first and second longitudinal position along the z-axis. In some embodiments the distance along the longitudinal z-axis between these first and second longitudinal positions is at least 50% of the total length along the z-axis of the first and second electrodes 12 and 14 or the lasing medium. Regarding this distance, other embodiments have more stringent applications requiring the distance to be at least 25% and other embodiments with less demanding applications require the distance to be at least 75%. Regarding variation in inter-electrode gap, inter-wall gap, or thickness or width of lasing medium, other embodiments with less demanding applications require at least a 5% variation, and still other embodiments having more demanding applications require at least a 15% variation.

For these embodiments, the amount of variation, such as at least 5%, 10%, or 15% of inter-electrode gap, inter-wall gap or lasing medium thickness or width, is designated as the total amount of variation of a continuous nature that have continuous variations in sections of the inter-electrode gap, inter-wall gap, or the lasing medium thickness or width between a first and second position along the z-axis, such as found with curved surfaces or planar slopes, and does not include sections between the first and second position along the z-axis that have no variation or have other variations of a discontinuous nature, such as a step change in lasing medium thickness or width or inter-electrode gap or inter-wall gap. For some embodiments, discontinuous changes in the inter-electrode gap or inter-wall gap or lasing medium thickness or width occur in positions interspersed along the z-axis between sections along the z-axis having continuous changes in the inter-electrode gap or inter-wall gap or lasing medium, whereas with other embodiments, discontinuous changes occur in sections that are not interspersed along the z-axis among sections of continuous change.

Figure 2B:
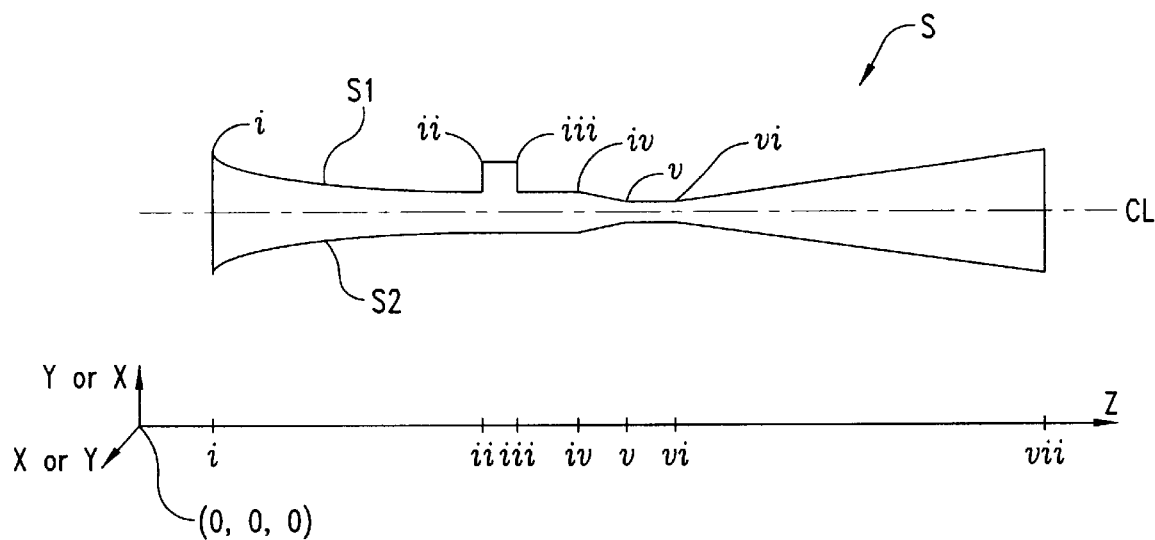
FIG. 2B is a longitudinal cross-sectional profile representative of possible shapes for inter-electrode gaps, inter-wall gaps, lasing medium thickness, or lasing medium width.

As an exaggerated illustrative example, the shape S in FIG. 2B is representative of an exemplary inter-electrode gap with top and bottom surfaces S1 and S2 representing inner surfaces 15a and 15b of the first and second electrodes 12 and 14, respectively, or an exemplary inter-wall gap with top and bottom surfaces S1 and S2 representing inner surfaces 15c and 15d of the first and second electrodes, respectively. The shape S is also representative of a lasing medium thickness with top and bottom surfaces S1 and S2 representing side surfaces 26a and 26b, respectively, and is also representative of a lasing medium width with top and bottom surfaces S1 and S2 representing inner surfaces 26c and 26d.

From point i to point ii along the z-axis, the shape S continuously narrows following a curved pattern along both the top and bottom surfaces S1 and S2 of the shape S. At point ii the top surface S1 undergoes first a discontinuous change. Between point ii and point iii both the top and bottom surfaces S1 and S2 undergo no continuous or discontinuous changes. At point iii, the top surface undergoes another discontinuous change. Between points iii and iv both the top and bottom surface S1 and S2 undergo no continuous or discontinuous changes. Between points iv and v both the top and bottom surfaces undergo continuous change of a planar nature. Between points v and vi both the top and bottom surfaces S1 and S2 undergo no continuous or discontinuous change. Between points vi and vii both the top and bottom surfaces S1 and S2 undergo continuous change.

In surveying the amount of continuous change in the illustrative example of shape S, between points i and ii and points iv and v, there is a total continuous change decreasing the distance between the top and bottom surfaces S1 and S2 by C1% of the largest distance between surfaces S1 and S2. The continuous change between points vi and vii of shape S increases the distance between the top and bottom surfaces S1 and S2 by C2% of the largest distance between the top and bottom surfaces S1 and S2. In general, the total continuous change of the distance between the longitudinal z-axis is then the sum of the total continuous change that decreases and increases the inter-electrode gap or lasing media thickness as measurements are taken along the longitudinal z-axis further from the (0,0,0) axis origin. In the case illustrated in FIG. 2B, the total continuous change of shape S is the sum of absolute values of C1% and C2% of the largest distance between top and bottom surfaces S1 and S2 between points i and vii along the longitudinal z-axis. As is typical in many embodiments, the areas of continuous change of the top and bottom surfaces S1 and S2 shown in FIG. 2B are symmetrical about the longitudinal centerline, CL; however, in other embodiments, the areas of the continuous change of the top and bottom surfaces S1 and S2 are not symmetrical.

The lasing medium is contoured to approximate the shape of the lowest order Gaussian beam that propagates within the lasing medium corresponding to the lowest order transverse mode of the laser beam produced by the slab laser 10. Since the shape and dimensions of the lowest order Gaussian beam will be different depending upon specific details of the particular laser in use, the contouring of the lasing medium will be done on a case by case basis. The shape of the lasing medium or electrode used to shape the lasing medium is chosen to ensure adequate discrimination between the lowest order transverse mode of propagation and the next higher order competing transverse mode.

Within a stable optical resonator a free space beam propagates according to the theory of Gaussian beams from which beam diameter at the front and rear mirrors and anywhere else along the longitudinal z-axis direction of a resonator may be mathematically determined. See, for example, N. Hodgson and H. Weber, *Optical Resonators: fundamentals, advanced concepts and applications*, Springer-Verlag, London, 1997, chapter 5, pp. 165–222. Based on this theory of Gaussian beams, one can then determine profiles for the fundamental and higher order optical transverse modes regarding particular lasers having specific resonator cavities and lasing media.

These transverse mode profiles can then be used to shape either the lasing medium for cases such as solid state lasers or to shape electrodes that in turn shape gaseous lasing media. For instance, the fundamental transverse mode profile for a particular laser could be used to shape the lasing medium or electrodes in order to truncate all other ransverse modes of order higher than the fundamental transverse mode, such as in the case of the depicted embodiment.

Other embodiments use a transverse mode profile of a second transverse mode above the fundamental transverse mode to shape the lasing medium directly or to shape the electrodes to truncate transverse modes of order higher than this second transverse mode. In some of the embodiments, there are one or more transverse modes, due to their order lower than this second transverse mode, that are also not truncated by the shaped lasing medium or shaped electrodes.

In general, shaping of the lasing medium or electrodes according to a transverse mode profile causes the lasing medium or electrodes to act as an aperture to discriminate between a selected group of one or more lower order transverse modes and all other transverse modes of order higher than those of the group. To truncate transverse modes of order higher than those of a desired group of one or more lower order modes, ideally the lasing medium or electrodes would be in the shape of the highest transverse mode of the desired group.

Figure 3:
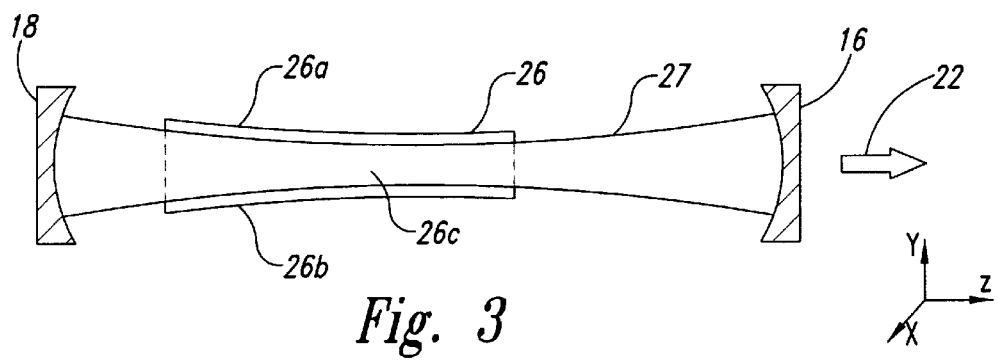
FIG. 3 is a longitudinal cross-sectional schematic drawing of a slab laser utilizing a shaped lasing medium embodiment of the present invention.
Figure 4:
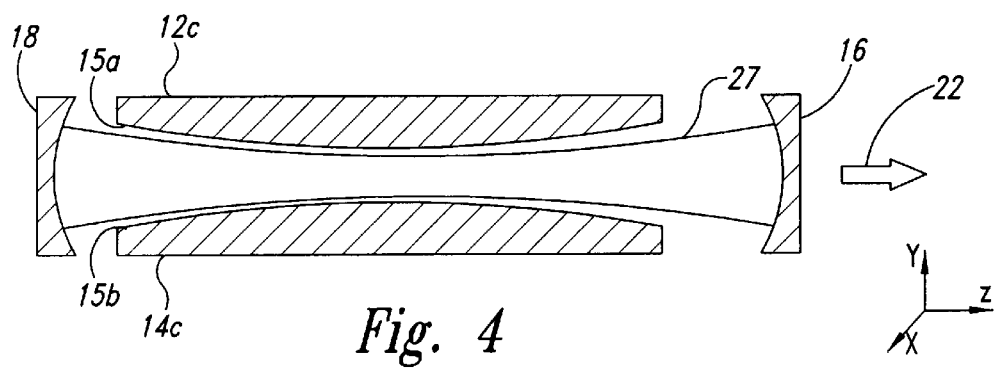
FIG. 4 is a longitudinal cross-sectional schematic drawing of a slab laser utilizing a shaped electrode embodiment of the present invention.

Ideally, to truncate all transverse modes above the fundamental transverse mode, the lasing medium or electrodes would be shaped identical to the propagation of the fundamental transverse mode in space. A solid state lasing medium 26 having side surfaces 26a and 26b shaped to exactly match the fundamental transverse mode profile results in a beam shape 27 matching the fundamental transverse mode profile of the slab laser 10 as illustrated in FIG. 3. A first and second electrode 12c and 14c shaped to exactly match the fundamental transverse mode profile of the slab laser 10 also results in the beam shape 27 matching the fundamental mode profile as illustrated in FIG. 4.

In practice, shaping the lasing medium or electrodes to exactly match a transverse mode profile may be relatively difficult or may be prohibitively expensive to fabricate in a mass production facility. There are alternatives that closely approximate the ideal shape that would also result in transverse mode discrimination and enhanced overall laser performance.

Figure 4A:
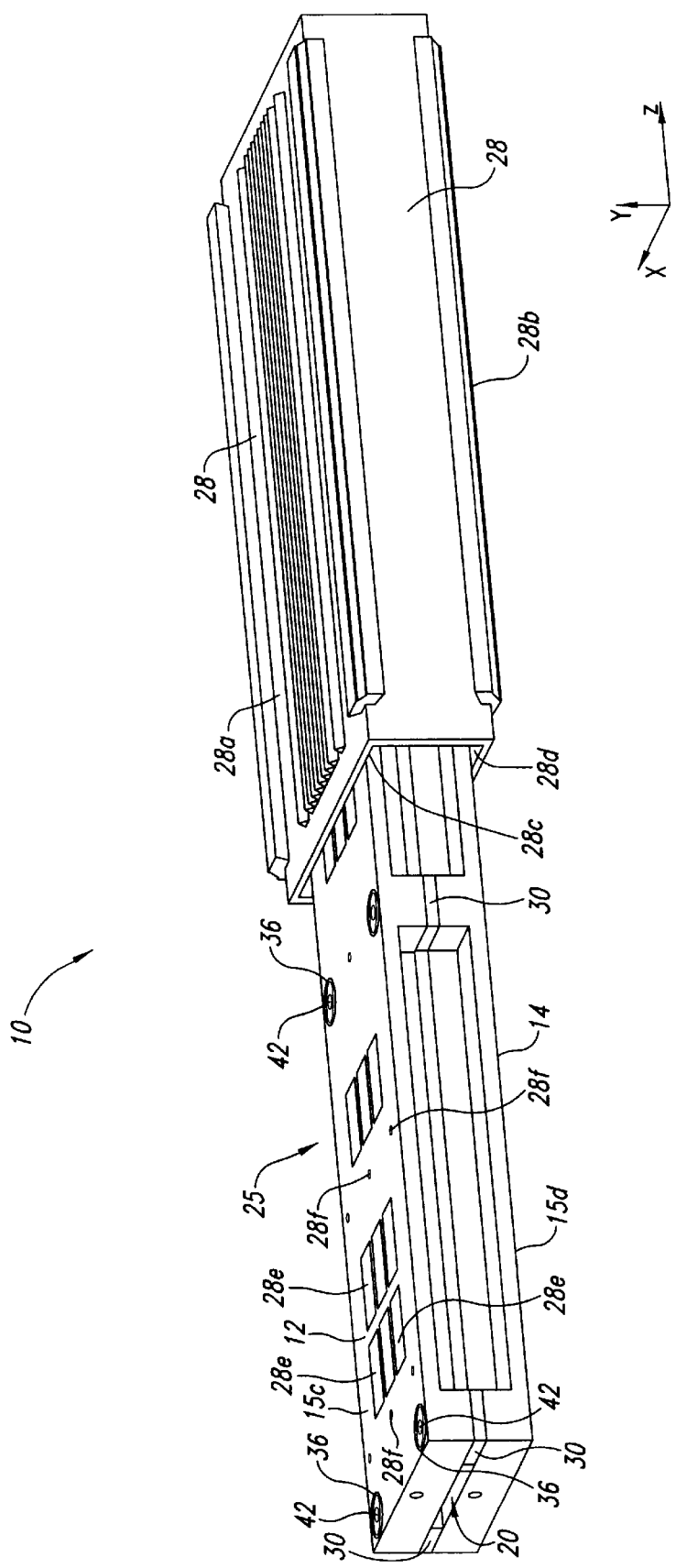
FIG. 4A is an isometric schematic drawing of a slab laser of FIG. 1 illustrating an associated housing.

For example, the depicted embodiment of FIG. 1, as discussed above, the first and second inner surfaces 15a and 15b of the first and second electrodes 12 and 14, respectively, have a slight curvature or bow shape running longitudinally with respect to positions along the longitudinal z-axis. This curvature in the first and second inner surfaces 15a and 15b of the first and second electrodes 12 and 14, respectively, is due to atmospheric pressure on top and bottom outer surfaces 28a and 28b of a housing 28 acting through top and bottom inner surfaces 28c and 28d of the housing in contact with thermal material 28e and 28f further in contact with outer surfaces 15c and 15d of the first and second electrodes 12 and 14, respectively, to bow the first and second electrodes into the correct contour as shown in FIG. 4A where the electrode assembly 25 is shown being inserted into the housing 28. In the depicted embodiment, all transverse modes are truncated above the fundamental transverse mode. Other embodiments form the first and second electrodes 12 and 14 by methods such as bending or casting to permanently shape the electrodes without reliance on how the electrodes are assembled into the electrode assembly 25.

Figure 5:
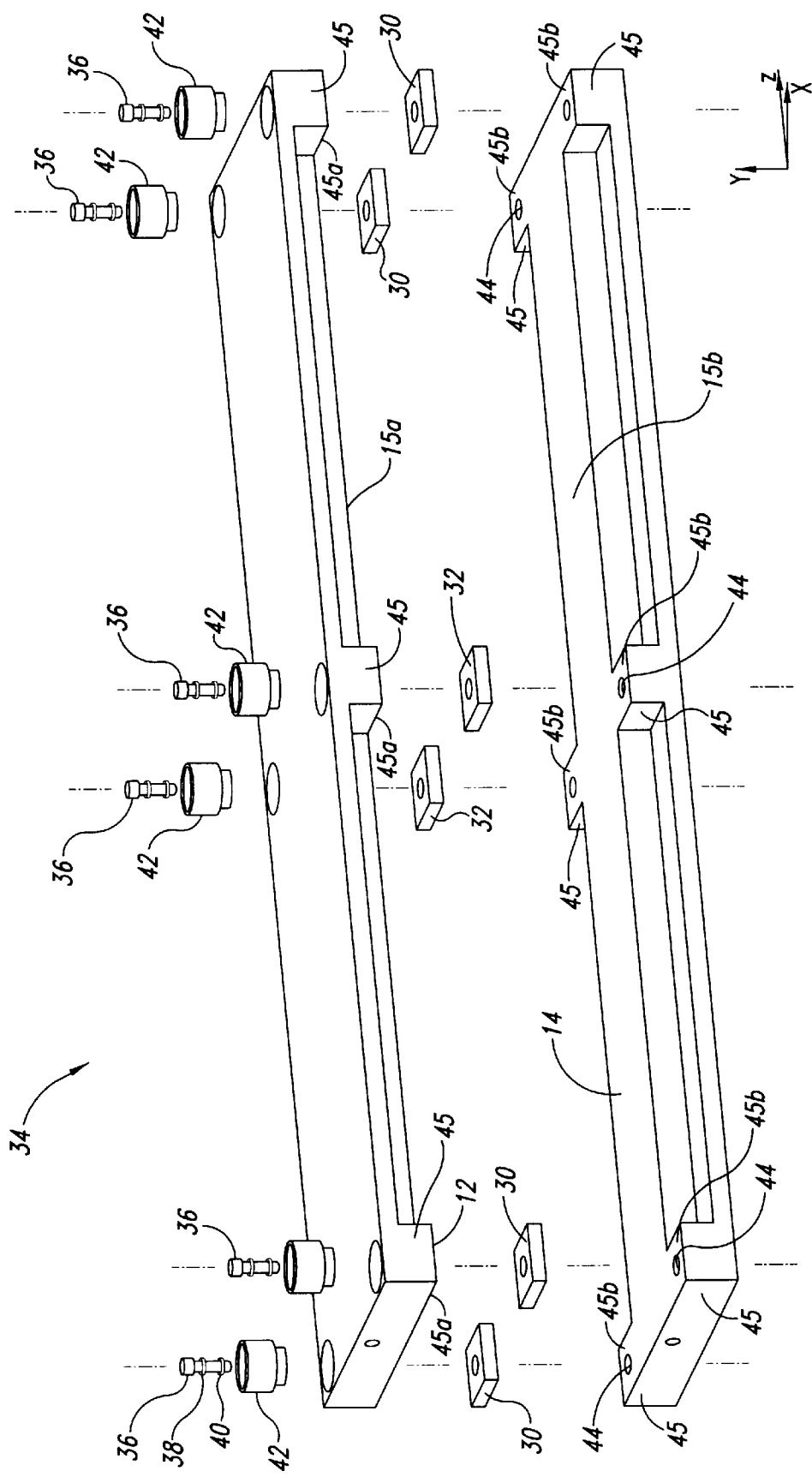
FIG. 5 is an exploded isometric schematic drawing of the electrode assembly of the slab laser of FIG. 1.

To supplement the atmospheric effect, a series of insulating spacers with appropriately varying dimensions positioned along the length of the first and second electrodes 12 and 14 would further help to closely approximate the ideal transverse mode contour. For instance, the depicted embodiment uses end spacers 30 and mid-spacers 32 made of ceramic material to form a simple bow between the first and second electrodes 12 and 14 and to maintain separation and electrical isolation between the electrodes as shown in FIG. 5. In the depicted embodiment, the first and second electrodes 12 and 14 are assembled into an electrode assembly 34 with the bolts 36 being threaded through lock washers 38, flat washers 40, and through ceramic bushings 42 in pads 45 of the first electrode into threaded holes 44 in pads 45 of the second electrode. The pads 45 of the first and second electrodes 12 and 14 have first and second inner surfaces 45a and 45b that may be at slightly different y-axis positions than the inner surfaces 15a and 15b of the first and second electrodes.

In the depicted embodiment, mid-spacers 32 are approximately 0.4 mm thinner than the end spacers 30, thus assisting in producing a bow with the first and second electrodes 12 and 14. In this depicted embodiment the narrowest gap between the first and second electrodes occurs at the same point along the z-axis as where the mid-spacers 32 are located. This narrowest gap acts as a filter toward higher order transverse modes. Other embodiments use additional spacers along the first and second electrodes 12 and 14 to further assist in shaping the electrodes according to various transverse mode profiles. For instance, in one embodiment spacers are positioned halfway along the longitudinal z-axis between the end spacers 30 and mid-spacers resulting in a total of 10 spacers being used. Since the spacers are relatively inexpensive to incorporate into a laser assembly, they provide a cost-effective alternative to exactly matching a transverse mode profile. If a sufficient number of spacers are used, shaping of the electrodes can be entirely due to use of the spacers rather than also due to atmospheric forces, which may be a more reliable approach under some circumstances. Shaping of the electrodes can be accomplished by combinations of varying the thickness or number of end spacers 30 and mid-spacers 32 and/or varying the y-axis positions of the first and second surfaces 45a and 45b of the pads 45.

Figure 6:
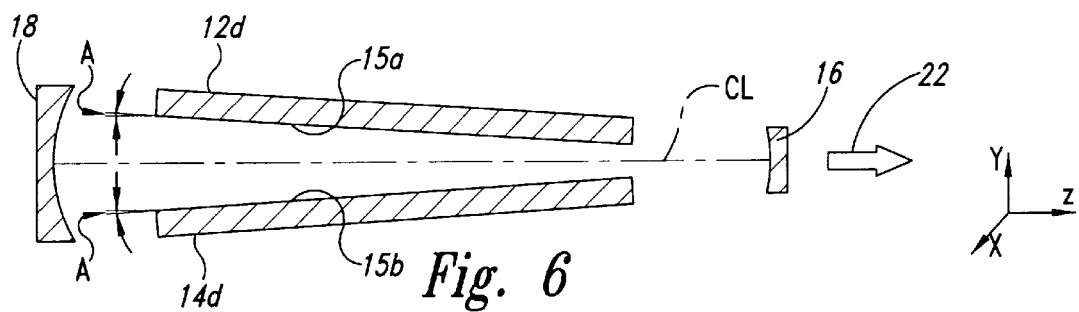
FIG. 6 is a longitudinal cross-sectional schematic drawing of a slab laser utilizing a tapered electrode embodiment of the present invention.

Additional embodiments use other ways to approximate an ideal transverse mode profile. For instance, as shown in FIG. 6, some embodiments approximate the shape of propagation of a desired transverse mode by planar electrodes that are positioned at an angle A with respect to the longitudinal center line CL of the beam along the z-axis to form a taper of the first and second electrodes 12d and 14d toward the front mirror 16. For instance, one alternative embodiment has an inter-electrode gap of 4.0 mm near the rear mirror 18 and an inter-electrode gap of 3.75 mm near the front mirror 16. This approximation using tapered planar electrodes is particularly suitable for embodiments in which the size of the fundamental transverse mode has relatively little variation along its path of propagation within the lasing medium. Also, the potential exists for easier alignment of the front and rear mirrors 16 and 18, especially for this tapered planar electrode configuration since wall reflections may allow support for transverse modes that are not parallel to the discharge axis.

Figure 7:
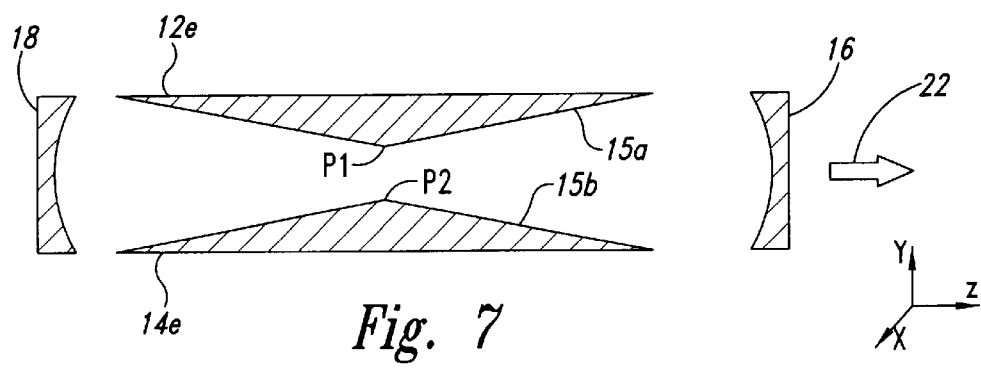
FIG. 7 is a longitudinal cross-sectional schematic drawing of a slab laser utilizing a triangular electrode embodiment of the present invention.

Other embodiments use tapered planar first and second electrodes 12e and 14e that progressively narrow the inter-electrode gap starting from both the front and rear mirrors 16 and 18 and proceeding along the longitudinal z-axis to intermediate points P1 and P2, respectively, as shown in FIG. 7. The embodiment illustrated in FIG. 7 use triangularly shaped first and second electrodes 12e and 14e both having intermediate points P1 and P2 at the same position along the longitudinal z-axis mid-way between the front and rear mirrors 16 and 18. Other embodiments shift the points P1 and P2 so that they still are located in the same position along the z-axis, however, they are not precisely mid-way between the front and rear mirrors 16 and 18. Other embodiments shift the points P1 and P2 relative to each other so that they are not located at the same point along the z-axis in order to provide additional filtering aspects. Although the points P1 and P2 may be shifted with respect to one another, the first and second inner surfaces 15a and 15b of the first and second electrodes 12 and 14 are symmetrical with one another. In general, the first and second inner surfaces 15a and 15b of the first second electrodes 12 and 14 are symmetric with one another and the side surfaces 26a and 26b defining the thickness of the crystal lasing medium are symmetric with one another across an axis parallel to the z-axis or across an arbitrary axis. The crystal medium 26 can also have side surfaces 26c and 26d (not shown) defining the width across the x-axis of the crystal lasing medium with respect to one or more transverse modes.

Figure 8:
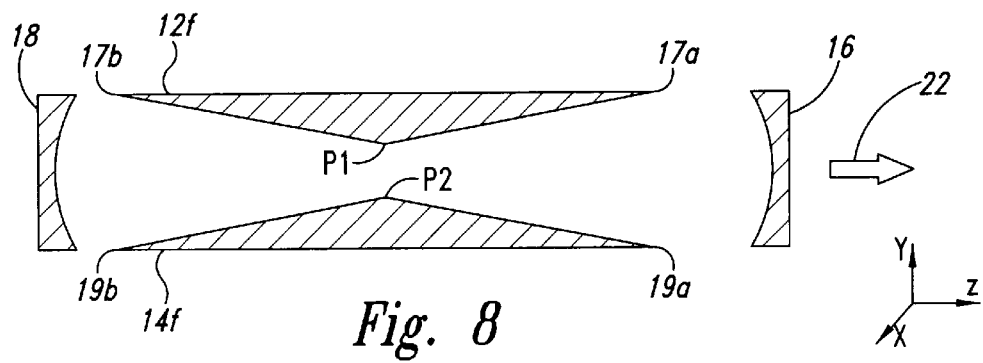
FIG. 8 is a longitudinal cross-sectional schematic drawing of a slab laser utilizing a shaped electrode embodiment of the present invention.

Still other embodiments utilize triangular electrodes 12f and 14f with rounded corners at the P1 and P2 points, respectively, and with the first and second ends 17a, 17b and 19a, 19b of the triangular electrodes 12f and 14f, respectively, being either rounded or otherwise modified or truncated as shown in FIG. 8.

Figure 9:
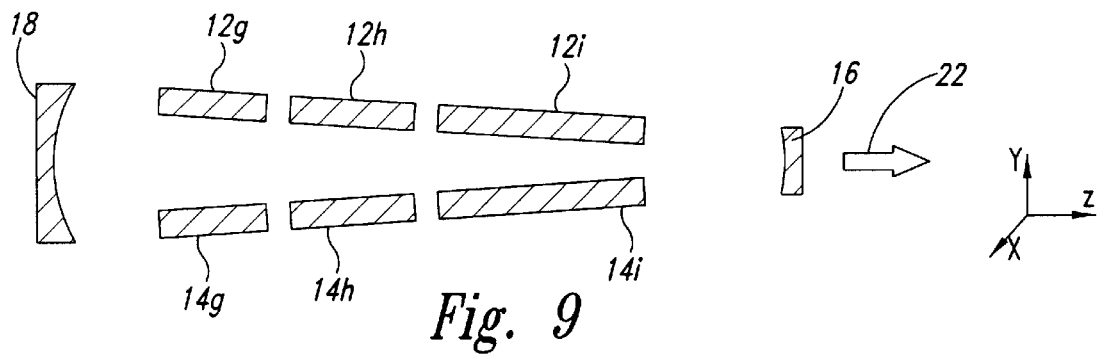
FIG. 9 is a longitudinal cross-sectional schematic drawing of a slab laser utilizing a multiple tapered electrode embodiment of the present invention.
Figure 10:
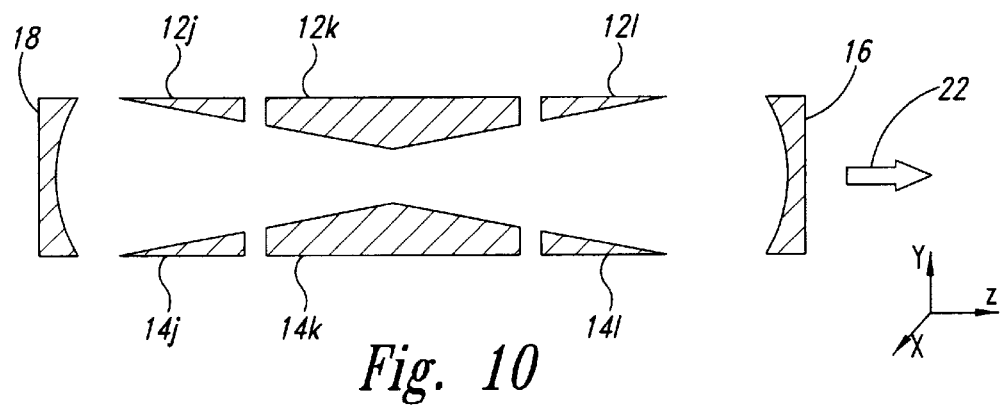
FIG. 10 is a longitudinal cross-sectional schematic drawing of a slab laser utilizing a multiple triangular electrode embodiment of the present invention.

Further embodiments have more than one discharge space (gain region) by having more than one set of first and second electrodes such as 12g, 14g, 12h, 14h, and 12i, 14i for a tapered electrode configuration as shown in FIG. 9, and such as 12j, 14j, 12k, 14k, 12l, and 14l for a triangularly shaped electrode as shown in FIG. 10. Other embodiments involve solid state lasers having more than one gain region by using more than one piece of solid state crystal lasing medium such as first and second solid state crystals 29a and 29b shown in FIG. 11. For the laser illustrated in FIG. 11, an inter-cavity polarization rotator 48 is placed between the first and second solid state crystals 29a and 29b to help compensate for thermal birefringence. Other embodiments having more than one solid state crystal do not use a polarization rotator.

Further embodiments include more than one set of first and second electrodes with each set having differently shaped electrodes. Other embodiments include more than one piece of crystal lasing medium being differently shaped from one another. Some of these differently shaped electrodes or differently shaped lasing media have nearly an ideal shape according to the desired transverse mode or modes and others are straight or bowed to approximate an ideal shape. These variously shaped sets of electrodes are then used together in some embodiments and in other embodiments these variously shaped pieces of crystal lasing medium are used together.

In some embodiments, such as the depicted embodiment, the first and second electrodes 12 and 14, or first and second sets of electrodes making up the first and second electrodes, are symmetric to one another with respect to the longitudinal z-axis. Other embodiments use one or more pieces of crystal lasing media that are symmetric with respect to the z-axis. In other embodiments, the first and second electrodes 12 and 14, or first and second sets of electrodes making up the first and second electrodes, are not symmetric to one another with respect to the z-axis. With other embodiments, one or more pieces of the crystal lasing medium are not symmetric with respect to the z-axis.

Figure 11:
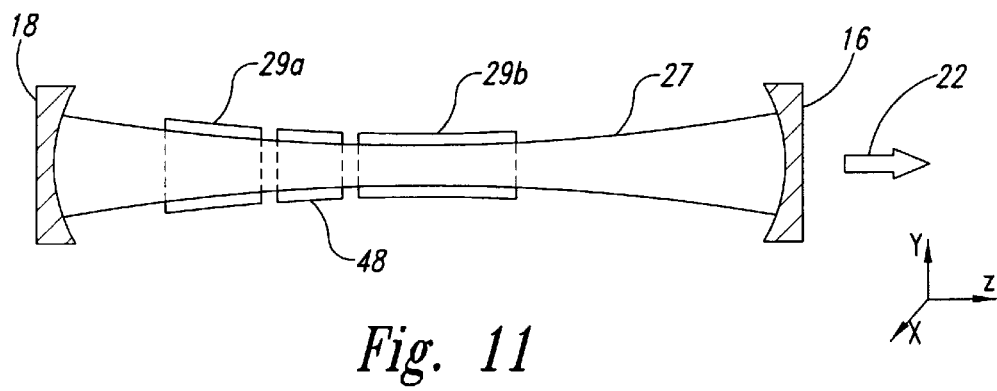
FIG. 11 is a longitudinal cross-sectional schematic drawing of a laser utilizing a multiple shaped lasing medium embodiment of the present invention.

The embodiments shown in FIGS. 10 and 11 use sets of electrodes and pieces of crystal lasing media that are in series with one another with respect to the z-axis. Other embodiments geometrically arrange, as a common resonator, the electrode sets and the pieces of crystal lasing media differently with respect to one another, such as in an array.

There are practical limits as to how much taper could be applied to the first and second electrodes 12 and 14 without significant non-uniformities such as variations in the electric field that excites the discharge in a gas laser. In most cases, a maximum of 5% to 10% field strength variation in the discharge electric field would be an upper limit of feasibility. With this in mind, for many applications it would be desirable to maintain a relatively flat beam propagation contour. A relatively small change in the inter-electrode gap would help to insure that voltage uniformity of the electric field is maintained. Solid state, liquid, or dye lasers may allow greater taper of the lasing medium than gas lasers.

Figure 12:
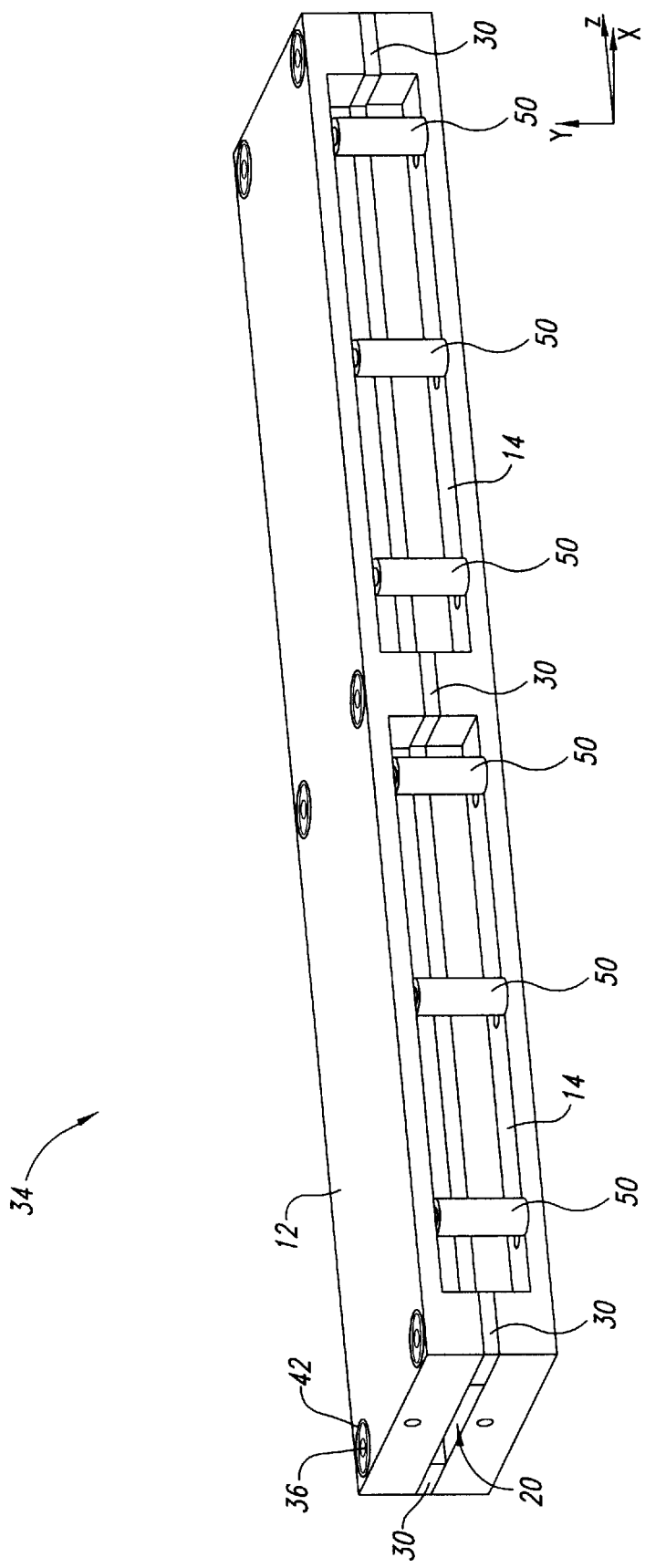
FIG. 12 is an isometric schematic drawing of an alternative embodiment of the electrode assembly of FIG. 5 showing compensating inductors.

On the other hand, in some embodiments, situations arise where there is a significant non-uniform voltage distribution even with parallel electrodes and even greater non-uniform voltage distributions exist with non-parallel electrodes. To reduce these voltage uniformities while continuing to use appropriately shaped electrodes for transverse mode selection, inductors 50 are selected to couple the first and second electrodes 12 and 14 together as shown in FIG. 12 to balance out the voltage distribution between the electrodes. By judicious choice of the electrode structure, in combination with the methods used to energize the electrodes and use of inductors to limit variation in the electric field between the electrodes, larger variations in the inter-electrode gap are possible for effective transverse mode selection.

Figure 13:
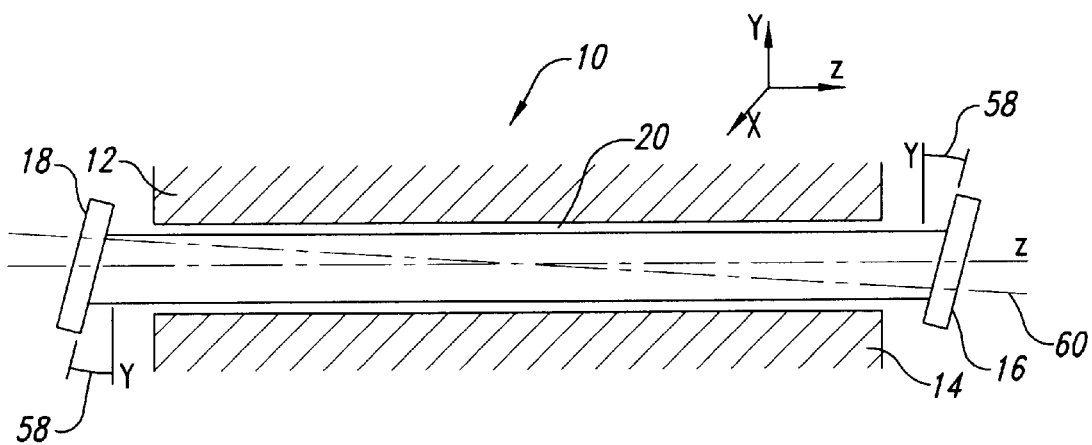
FIG. 13 is a longitudinal cross-sectional schematic drawing of a slab laser utilizing a tilted mirror resonator embodiment of the present invention.

Additional embodiments of lasers tilt the front and rear mirrors 16 and 18 by an angle 58, for example 1–3 mrad, with respect to the y-axis such that an optical axis 60 of the resonator cavity 20 is not parallel with the longitudinal z-axis as shown in FIG. 13. In these embodiments, the tilt of the front and rear mirrors 16 and 18 assist to increase laser efficiency due to the oscillatory nature of propagation of the transverse modes when tilted mirrors are used. Applications of the tilted mirrors in these embodiments are particularly helpful for lasers that have relatively low gain.

Efficiency is improved because the theoretical fundamental transverse mode as an operational transverse mode travels through portions of the lasing medium that are near the first and second electrodes 12 and 14, and typically have a higher gain than other portions of the lasing medium. In these tilted mirror lasers, the first and second electrodes 12 and 14 are usually not polished so that they serve as a loss mechanism for transverse modes of higher order than the selected transverse mode, such as the theoretical fundamental transverse mode.

From the foregoing it will be appreciated that, although specific embodiments of the invention have been described herein for the purposes of illustration, various modifications may be made without deviating from the spirit and scope of the invention. Accordingly, the invention is not limited except as by the appended claims.

What is claimed is:

1. A laser, comprising:
   a lasing medium;
   a discharge space;
   front and rear mirrors on opposing ends of the discharge space, the front and rear mirrors forming a resonator cavity, the resonator cavity containing the discharge space, at least a portion of the lasing medium being within the discharge space; and
   first and second elongated electrodes having first and second inner surfaces, respectively, the first and second inner surfaces each extending along a longitudinal axis and being separated by an inter-electrode gap on opposing sides of the discharge space, selected one or more portions of the first inner surface and the second inner surface being shaped along the longitudinal axis to have continuous variation in the inter-electrode gap such that the inter-electrode gap at a first longitudinal axis position varies from the inter-electrode gap at a second longitudinal axis position by at least 5% where the longitudinal distance between the first and second longitudinal axis positions is at least 25% of the distance between the front and rear mirrors.

2. The laser of claim 1 wherein the first and second inner surfaces are shaped such that the inter-electrode gap along the longitudinal axis varies to approximate the theoretical fundamental transverse mode of the laser.

3. The laser of claim 1, further comprising a sealed housing to contain the lasing medium.

4. The laser of claim 1 herein the laser has a Fresnel number of over 0.35 with respect to the inter-electrode gap.

5. The laser of claim 1 wherein the first and second inner surfaces include planar and bowed sections.

6. The laser of claim 1 wherein the first and second inner surfaces are symmetric with respect to the longitudinal axis.

7. The laser of claim 1, further comprising a plurality of spacers having different thicknesses and being positioned to space portions of the first and second electrodes at different distances from each other to define the inter-electrode gap along the longitudinal axis.

8. The laser of claim 1 wherein the inter-electrode gap between inward portions of the first and second inner surfaces is at least 15% different than the inter-electrode gap between front end portions of the first and second inner surfaces.

9. The laser of claim 1 wherein the first and second inner surfaces are parallel along the longitudinal axis.

10. The laser of claim 1, further comprising a third mirror and the first and second inner surfaces are other than parallel with the longitudinal axis.

11. A laser, comprising:
    one or more gain regions;
    a first mirror and a second mirror being on first and second ends of the gain regions, the first and second mirrors contributing to form a resonator cavity, the resonator cavity containing the gain regions; and
    one or more sections of lasing media, each lasing media section having width along a first transverse axis, thickness along a second transverse axis, and length along a longitudinal axis, the lasing media sections having a total length extending along the longitudinal axis, the lasing media sections occupying at least a portion of the gain regions, one or more portions of the lasing media sections being shaped to have continuous variations in thickness along the longitudinal axis, the thickness of the lasing media section having a total variation between first and second positions along the longitudinal axis due to the continuous variations of at least 5% of the maximum thickness of the lasing media, the first and second longitudinal positions being separated by at least 25% of the total length.

12. The laser of claim 11 wherein the thicknesses of the lasing media sections along the longitudinal axis approximates the theoretical fundamental transverse mode of the laser.

13. The laser of claim 11, further comprising a third mirror directed along an axis other than the longitudinal axis.

14. The laser of claim 11 wherein the thickness of one of the lasing media sections at a first longitudinal position along the longitudinal axis is at least 10% different than the thickness of one of the other lasing media sections at a second longitudinal position along the longitudinal axis.

15. The laser of claim 11 wherein the thickness of one or more of the lasing media sections with respect to the longitudinal position thereof along the longitudinal axis approximates a transverse mode of order higher than a theoretical fundamental transverse mode of the laser.

16. A method of forming a laser, the method comprising:
defining a set of one or more longitudinal axes to be used in forming electrodes, the set of longitudinal axes having a total length to define the total length of the electrodes;
forming a first set of one or more electrodes with a first set of one or more inner surfaces, one or more of the first set of inner surfaces varying in shape along one or more of the sets of longitudinal axes;
forming a second set of one or more electrodes with a second set of one or more inner surfaces, one or more of the second set of inner surfaces varying in shape along one or more of the sets of longitudinal axes; and
positioning the first and second sets of electrodes with the first and second sets of inner surfaces opposing one another to form an inter-electrode gap therebetween having a gap width, each of the first and second sets of inner surfaces varying in shape along their respective longitudinal axis of the set of longitudinal axes such that one or more portions of the gap width of the inter-electrode gap has continuous variations along the set of longitudinal axes between first and second longitudinal positions with differences in gap width of at least 5% due to the continuous variations, the first and second longitudinal positions being longitudinally spaced apart by at least 25% of the total length.

17. The method of claim 16, further comprising forming the first and second sets of inner surfaces so that the inter-electrode gap approximates the theoretical fundamental transverse mode of the laser.

18. The method of claim 16, further comprising positioning the first and second sets of electrodes so that the laser has a Fresnel number of over 0.35 with respect to the inter-electrode gap.

19. The method of claim 16, further comprising forming the first and second sets of inner surfaces to include planar and bowed sections.

20. The method of claim 16, further comprising the first and second sets of inner surfaces being symmetric with respect to their respective longitudinal axes.

21. The method of claim 16, further comprising positioning the first and second sets of electrodes so that some of their respective longitudinal axes are other than parallel with respect to others of their respective longitudinal axes.

22. The method of claim 16, further comprising forming the first and second sets of electrodes so that the inter-electrode gap varies by at least 10% with respect to at least two positions along one or more of the longitudinal axes.

23. The method of claim 16, further comprising forming the first and second sets of inner surfaces such that the inter-electrode gap approximates a transverse mode of order higher than a theoretical fundamental transverse mode of the laser.

24. A method of forming a laser, the method comprising:
forming a set of one or more lasing media sections, the set of lasing media sections having a total length, each of the lasing media sections having a width along a first transverse axis of a first set of one or more transverse axes, each of the lasing media sections having a thickness along a second transverse axis of a second set of one or more transverse axes, and each of the lasing media sections having a length along a longitudinal axis of a set of one or more longitudinal axes; and
varying the thickness of the lasing media sections to have continuous variations for portions of one or more sections of the set of lasing media sections along their respective longitudinal axes so that one section of the set of lasing media sections at a first longitudinal position thereof has a thickness that is at least 5% smaller than one section of the set of lasing media sections at a second longitudinal position thereof due to the continuous variations, the first and second longitudinal positions being separated from each other along the respective longitudinal axes by at least 25% of the total length.

25. The method of claim 24, further comprising forming the lasing media sections so that the thickness of lasing media sections approximates the theoretical fundamental transverse mode of the laser.

26. The method of claim 24, further comprising forming the lasing media sections to be symmetric with respect to one or more of the longitudinal axes.

27. The method of claim 24, further comprising forming one or more of the lasing media sections to each have longitudinal axes that are non-parallel to the longitudinal axis of each of one or more other lasing media sections.

28. The method of claim 24, further comprising forming one of the lasing media sections so that its thickness at a first longitudinal position is at least 15% different than one of the lasing media sections at a second longitudinal position.

* * * * *

UNITED STATES PATENT AND TRADEMARK OFFICE
CERTIFICATE OF CORRECTION

PATENT NO. : 6,198,759 B1
DATED : March 6, 2001
INVENTOR(S) : Jeffery A. Broderick et al.

It is certified that error appears in the above-identified patent and that said Letters Patent is hereby corrected as shown below:

<u>Column 14, claim 4,</u>
Line 13, "herein the laser" should read -- wherein the laser --

Signed and Sealed this

Twenty-eighth Day of August, 2001

*Attest:*

Nicholas P. Godici

NICHOLAS P. GODICI
*Attesting Officer*     *Acting Director of the United States Patent and Trademark Office*